United States Patent
Jung et al.

(10) Patent No.: US 8,971,889 B2
(45) Date of Patent: Mar. 3, 2015

(54) METHOD AND APPARATUS FOR HANDOVER BY CALCULATING THE DISTANCE BETWEEN A MOBILE USER EQUIPMENT AND AN INTERMEDIATE ACCESS POINT IN A WIRELESS COMMUNICATION SYSTEM

(75) Inventors: In Uk Jung, Anyang-si (KR); Yong Ho Kim, Anyang-si (KR); Jin Young Chun, Anyang-si (KR); Jin Lee, Anyang-si (KR); Bin Chul Ihm, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 532 days.

(21) Appl. No.: 13/202,321

(22) PCT Filed: Feb. 19, 2010

(86) PCT No.: PCT/KR2010/001047
§ 371 (c)(1),
(2), (4) Date: Oct. 28, 2011

(87) PCT Pub. No.: WO2010/095888
PCT Pub. Date: Aug. 26, 2010

(65) Prior Publication Data
US 2012/0039195 A1 Feb. 16, 2012

Related U.S. Application Data

(60) Provisional application No. 61/153,968, filed on Feb. 19, 2009, provisional application No. 61/153,983, filed on Feb. 20, 2009.

(51) Int. Cl.
*H04W 36/00* (2009.01)
*H04W 4/00* (2009.01)
*H04W 36/32* (2009.01)
*H04W 36/20* (2009.01)
*H04W 84/04* (2009.01)

(52) U.S. Cl.
CPC .............. *H04W 36/32* (2013.01); *H04W 36/20* (2013.01); *H04W 84/045* (2013.01)
USPC ............ 455/436; 455/438; 455/439; 370/331

(58) Field of Classification Search
CPC .... H04W 36/08; H04W 36/14; H04W 84/045
USPC .......................... 455/436, 438, 439; 370/331
See application file for complete search history.

(56) References Cited

U.S. PATENT DOCUMENTS

| | | | |
|---|---|---|---|
| 2007/0037584 A1 | 2/2007 | Um | |
| 2007/0183374 A1 | 8/2007 | Classon et al. | |
| 2007/0258407 A1* | 11/2007 | Li et al. | 370/331 |
| 2009/0213819 A1* | 8/2009 | Kalhan | 370/338 |
| 2010/0151862 A1* | 6/2010 | Park et al. | 455/436 |
| 2012/0176960 A1* | 7/2012 | Zhang et al. | 370/315 |

FOREIGN PATENT DOCUMENTS

| | | | |
|---|---|---|---|
| WO | WO 2006049456 A2 * | 5/2006 | |
| WO | 2007/111415 | 10/2007 | |

* cited by examiner

*Primary Examiner* — Omoniyi Obayanju
(74) *Attorney, Agent, or Firm* — Lee, Hong, Degerman, Kang & Waimey

(57) ABSTRACT

A method for supporting a handover on the basis of the distance from an intermediate access point to a user equipment includes receiving uplink message set information of the user equipment from a serving base station of the user equipment; receiving the uplink message transmitted by predetermined transmitting power from the user equipment, and detecting the user equipment which has sent the uplink message on the basis of the uplink message set information; determining the receiving power by which said uplink message is received; calculating the distance between the intermediate access point and the detected user equipment by using said predetermined transmitting power and said receiving power; and performing a subsequent handover based on the distance calculated in the previous step.

7 Claims, 7 Drawing Sheets

(a)

(b)

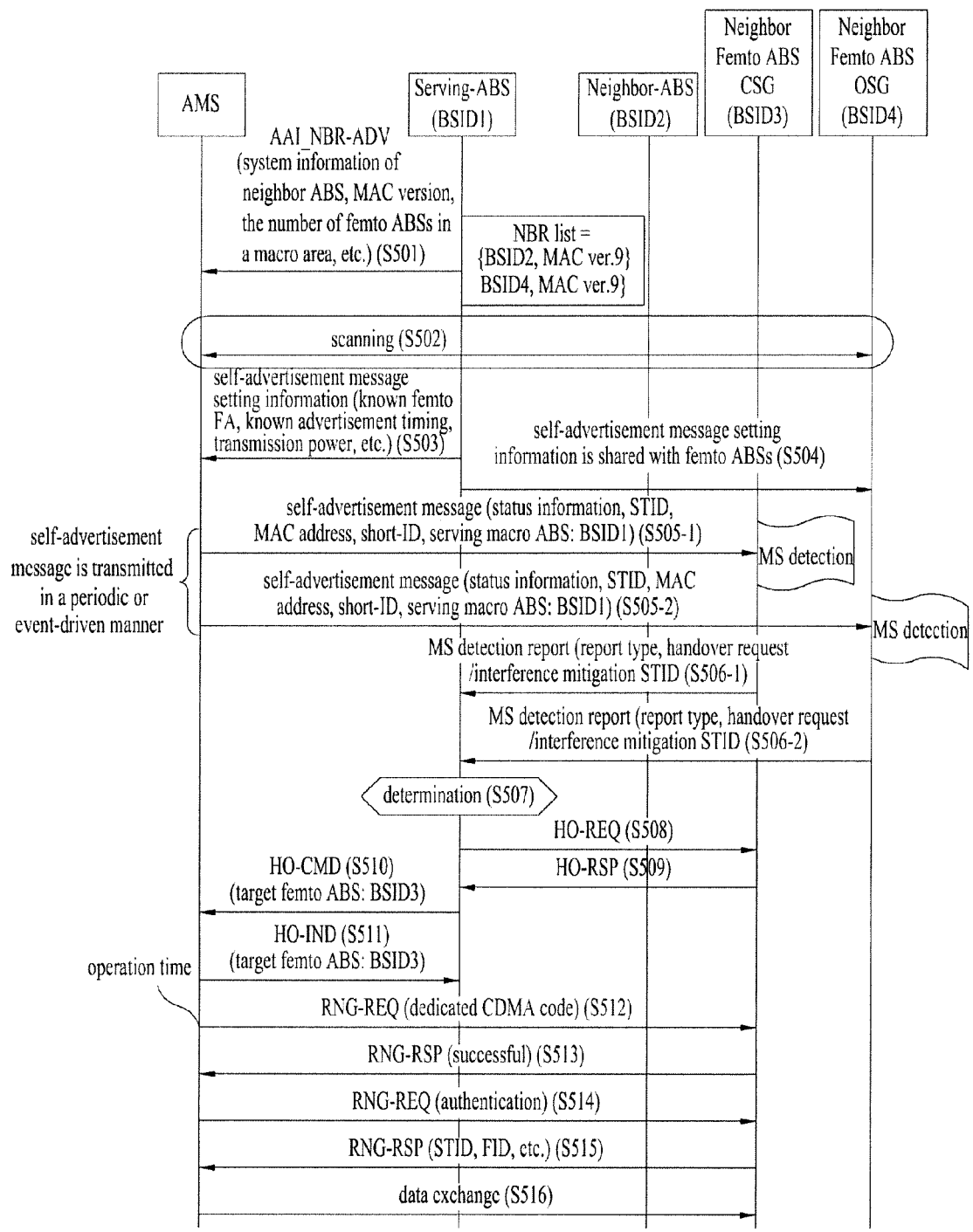

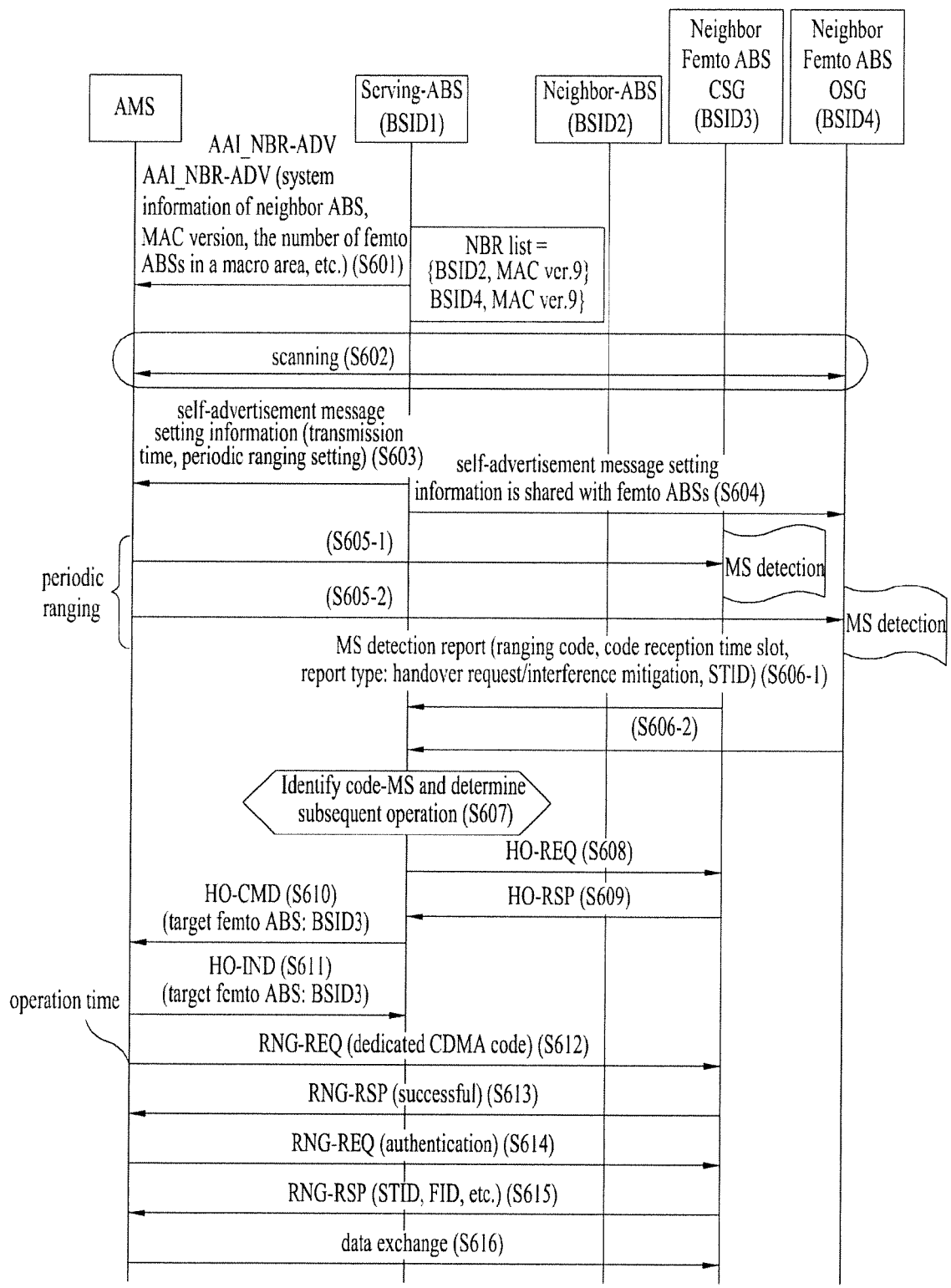

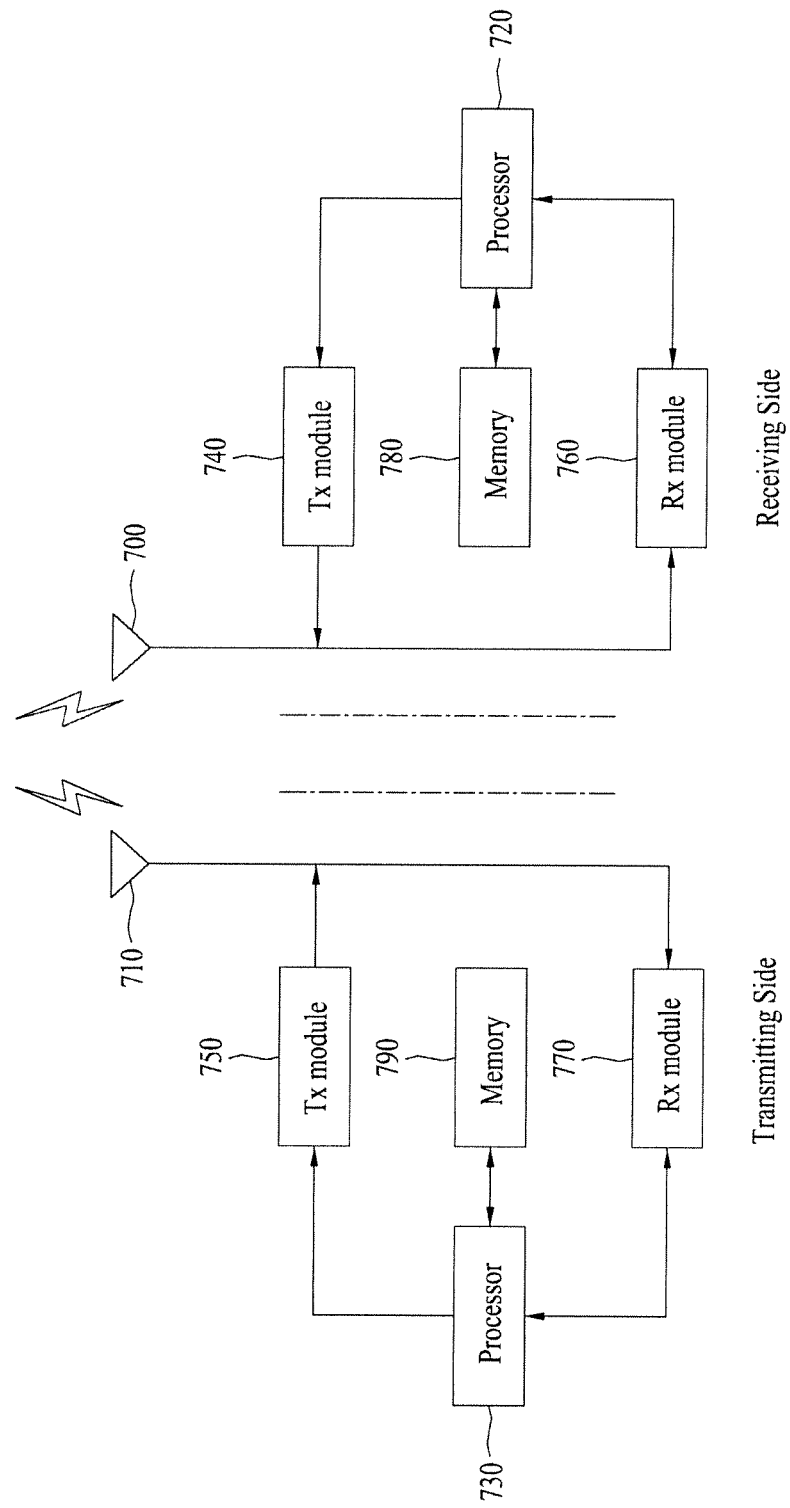

METHOD AND APPARATUS FOR HANDOVER BY CALCULATING THE DISTANCE BETWEEN A MOBILE USER EQUIPMENT AND AN INTERMEDIATE ACCESS POINT IN A WIRELESS COMMUNICATION SYSTEM

CROSS-REFERENCE TO RELATED APPLICATIONS

This application is the National Stage filing under 35 U.S.C. 371 of International Application No. PCT/KR2010/001047, filed on Feb. 19, 2010, which claims the benefit of U.S. Provisional Application Ser. Nos. 61/153,968, filed on Feb. 19, 2009, and 61/153,983, filed on Feb. 20, 2009.

TECHNICAL FIELD

The present invention relates to a wireless communication system. More particularly, the present invention relates to a handover method and apparatus using calculation of the distance between an Advanced Mobile Station (AMS) (or a user equipment) and an intermediate access point.

BACKGROUND ART

In a wireless communication system to which the present invention can be applied, a femtocell Advanced Base Station (femto ABS) is a small-size version of a macrocell Advanced Base Station (macro ABS) and performs most functions of the macro ABS. The femto ABS may be installed in an area covered by the macro ABS or may be installed in a shadow area that is not covered by the macro ABS.

A wireless communication system including femto ABSs is described below with reference to FIG. 1. FIG. 1 illustrates a configuration of a wireless communication system including femto ABSs. As shown in FIG. 1, the wireless communication system includes femto ABSs 110, a macro ABS 120, a femto network gateway (FNG) 130, an access service network (ASN) 140, and a connectivity service network (CSN) 150. The macro ABS 120 is a general base station of the conventional wireless communication system.

Each femto ABS 110 is a small-size version of the macro ABS 120 and performs most functions of the macro ABS 120. The femto ABS 110 directly connects to a transmission control protocol/Internet protocol (TCP/IP) network and operates independently as the macro ABS 120 does. The coverage of the femto ABS 110 is about 0.1 to 30 m and each femto ABS 110 can accommodate about 10 to 20 mobile stations. The femto ABS 110 may also use the same frequencies as the macro ABS 120 or may use different frequencies from the macro ABS 120.

The femto ABS 110 can cover an indoor or shadow area that is not covered by the macro ABS 120 and can support high data rates. The femto ABS 110 may be installed in an overlay fashion in a macrocell and may also be installed in a non-overlay fashion in an area that is not covered by the macro ABS 120.

The femto ABS 110 is classified into two types. The first type is a closed subscriber group (CSG) femto ABS and the second type is an open subscriber group (OSG) femto ABS. The CSG femto ABS groups mobile stations capable of accessing the CSG femto ABS and assigns a CSG ID to the group of mobile stations and allows only mobile stations assigned the CSG ID to access the CSG femto ABS. The OSG femto ABS is a base station which can be accessed by every mobile station.

As a gateway that controls the femto ABS 110, the FNG 130 is connected to the ASN 140 and the CSN 150 through an Rx interface and an Ry interface. The femto ABS 110 can receive a service from the CSN 150 through the FNG 130 and a mobile station connected to the femto ABS 110 can receive services of functions such as authentication and IP Multimedia Subsystem (IMS) from the FNG 130 or the CSN 150.

The CSN 150 provides the mobile station with connection to an application service such as the Internet or VoIP service. The ASN 140 controls the macro ABS 120 and manages connection between the macro ABS 120 and the CSN 150.

DISCLOSURE

Technical Problem

A large number of femto ABSs may be present around an Advanced Mobile Station (AMS) connected to a macro ABS. A femto ABS and a macro ABS may use the same frequency band. When an AMS that is being served by a macro ABS has approached a femto ABS which uses the same frequency band as that of the macro ABS, the AMS may receive a strong signal interference from the femto ABS.

In this case, the AMS may detect the femto ABS which causes the signal interference and report information of the signal interference to the serving macro ABS. Upon receiving the report from the AMS, the macro ABS can be aware of which femto ABS has caused the signal interference to the AMS. When the signal interference is strong such that the AMS needs to hand over to the femto ABS, the macro ABS may instruct the femto ABS which has caused the signal interference to reserve resources for the signal interference interval to perform an Interference Mitigation (IM) procedure or may instruct the AMS to hand over to the femto ABS. Alternatively, when a femto ABS which provides a stronger signal or which is in a better channel status is present around the AMS, the AMS may hand over to the femto ABS.

On the other hand, even when the AMS is currently in a good channel status, the AMS may hand over to a femto ABS which provides higher Quality of Service (QoS) when an application installed on the AMS requires higher QoS.

To perform mitigation of interference associated with a femto ABS or to perform handover to a femto ABS as described above, there is a need to correctly and efficiently detect femto ABSs around the AMS, which requires a technology for measuring the distance between the AMS and the femto ABS.

Technical Solution

In accordance with one embodiment of the present invention, the object of the present invention can be achieved by providing a method for an intermediate access point to perform handover based on a distance between the intermediate access point and a Mobile Station (MS) in a wireless communication system, the method including receiving setting information of an uplink message of the MS from a serving Base Station (BS) of the MS, receiving the uplink message which has been transmitted with a specific transmission power from the MS and detecting the MS which has transmitted the uplink message based on the setting information of the uplink message, determining a reception power with which the uplink message has been received, calculating a distance between the intermediate access point and the detected MS using the specific transmission power and the reception power, and performing a subsequent handover operation based on the calculated distance.

The uplink message setting information may include information regarding the specific transmission power and the specific transmission power may be predetermined by the serving BS.

The specific transmission power may be included as transmission power information in the uplink message.

The setting information of the uplink message may include at least one of a dynamic Frequency Assignment (FA), timing of the uplink message, a resource region, or the specific transmission power, and the uplink message includes at least one of an identifier of the MS, an Base Station Identifier (BSID) of the serving BS, or status information of the MS.

The uplink message may be an MS-initiated interworking signal and the MS-initiated interworking signal may be transmitted in one of a period manner or an event-driven manner.

The uplink message may be a periodic ranging message, the periodic ranging message may include a ranging code, and the ranging code may be one of a dedicated ranging code or a ranging code selected from a set of allocated ranging codes.

The uplink message may be an MS-dedicated uplink control channel message, and the MS-dedicated uplink control channel may be one of a Channel Quality Indicator Channel (CQICH), a Fast FeedBack Channel (FFBCH), a sounding channel, or a Physical Uplink Control Channel (PUCCH).

The uplink message setting information may include information specifying a frame M in which the uplink message may be to be transmitted and may be received at a timing of a frame L which precedes the frame M by a predetermined number of frames.

The method may further include transmitting a report message including a result of the detection of the MS and a result of the calculation of the distance to the serving BS.

In accordance with one embodiment of the present invention, there is provided a method for a Mobile Station (MS) to perform handover based on a distance between the MS and an intermediate access point in a wireless communication system, the method including receiving setting information of an uplink message of the MS from a serving Base Station (BS) of the MS, transmitting the uplink message with a specific transmission power based on the setting information of the uplink message, wherein the specific transmission power and a reception power with which the uplink message has been received by the intermediate access point are used to calculate a distance between the intermediate access point and the MS, and performing a subsequent handover operation based on the calculated distance.

In accordance with one embodiment of the present invention, there is provided a method for supporting handover based on distances between a Mobile Station (MS) and at least one intermediate access points in a wireless communication system, the method including transmitting setting information of an uplink message of the MS to the MS and the at least one intermediate access points, receiving a report message from each of the at least one intermediate access points to report that each of the intermediate access points has received the uplink message which the MS has transmitted with a specific transmission power, and determining a subsequent handover operation based on the report message, wherein the report message includes a result of detection that each of the at least one intermediate access points has performed to detect the MS that has transmitted the uplink MS based on the setting information of the uplink message and a result of calculation that each of the at least one intermediate access points has performed to calculate a distance between the intermediate access point and the MS using the specific transmission power and a reception power with which the uplink message has been received.

The subsequent handover operation may include at least one of an operation for initiating a procedure for mitigating interference of the at least one intermediate access points, an operation for initiating a procedure for the MS to hand over to one of the at least one intermediate access points, and an operation for providing a neighbor list including at least one of the at least one intermediate access points to the MS.

In accordance with one embodiment of the present invention, there is an intermediate access point for performing handover based on a distance between the intermediate access point and a Mobile Station (MS) in a wireless communication system, the intermediate access point including a reception module for receiving setting information of an uplink message of the MS from a serving Base Station (BS) of the MS and receiving the uplink message which has been transmitted with a specific transmission power from the MS and detecting the MS which has transmitted the uplink message based on the setting information of the uplink message, and a processor for determining a reception power with which the uplink message has been received, calculating a distance between the intermediate access point and the detected MS using the specific transmission power and the reception power, and performing a subsequent handover operation based on the calculated distance.

In accordance with one embodiment of the present invention, there is a Mobile Station (MS) for performing handover based on a distance between the MS and an intermediate access point in a wireless communication system, the MS including a reception module for receiving setting information of an uplink message of the MS from a serving Base Station (BS) of the MS, a transmission module for transmitting the uplink message with a specific transmission power based on the setting information of the uplink message, wherein the specific transmission power and a reception power with which the uplink message has been received by the intermediate access point are used to calculate a distance between the intermediate access point and the MS, and a processor for performing a subsequent handover operation based on the calculated distance.

In accordance with one embodiment of the present invention, there is an Base Station (BS) for supporting calculation of distances between a Mobile Station (MS) and at least one intermediate access points in a wireless communication system, the BS including a processor for determining setting information of an uplink message of the MS, a transmission module for transmitting setting information of an uplink message to the MS and the at least one intermediate access points, and a reception module for receiving a report message from each of the at least one intermediate access points to report that each of the intermediate access points has received the uplink message which the MS has transmitted with a specific transmission power, wherein the processor determines a subsequent handover operation based on the report message, and wherein the report message includes a result of detection that each of the at least one intermediate access points has performed to detect the MS that has transmitted the uplink MS based on the setting information of the uplink message and a result of calculation that each of the at least one intermediate access points has performed to calculate a distance between the intermediate access point and the MS using the specific transmission power and a reception power with which the uplink message has been received.

Advantageous Effects

According to the embodiments of the present invention, it is possible to calculate the distance between an AMS and each femto ABS and to hand over to the femto ABS according to the calculated distance. In addition, it is possible to efficiently detect femto ABSs around an AMS to which the AMS can hand over. Further, it is possible to reduce the burden (or load) of the AMS in terms of signal exchange and power management when detecting femto ABSs around the AMS. Furthermore, it is possible to correctly and efficiently detect femto ABSs around an AMS, thereby providing a service with higher quality to the AMS.

Advantages of the present invention are not limited to those described above and other advantages will be clearly understood by those skilled in the art from the following description.

DESCRIPTION OF DRAWINGS

FIG. 5 illustrates an exemplary method for calculating the distance between an AMS and an ABS using an MS-initiated interworking signal according to an embodiment of the present invention;

FIG. 6 illustrates an exemplary method for calculating the distance between an AMS and an ABS according to a periodic ranging according to an embodiment of the present invention; and FIG. 7 illustrates an exemplary configuration of transmitting and receiving sides according to another embodiment of the present invention.

BEST MODE

Figure 1:
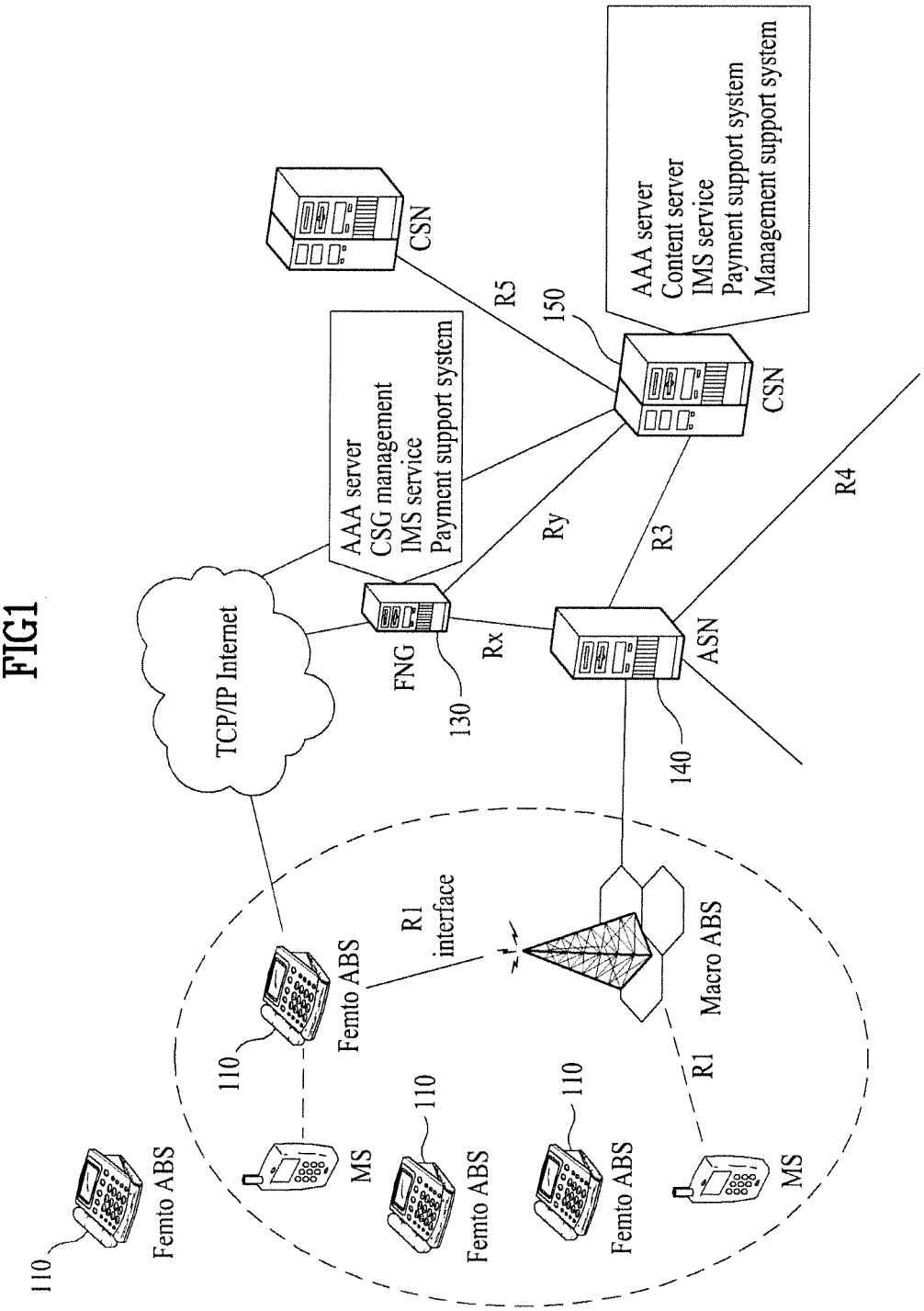
FIG. 1 illustrates an exemplary wireless communication system including femto ABSs.

The embodiments described below are provided by combining components and features of the present invention in specific forms. The components or features of the present invention can be considered optional unless explicitly stated otherwise. The components or features may be implemented without being combined with other components or features. The embodiments of the present invention may also be provided by combining some of the components and/or features. The order of the operations described below in the embodiments of the present invention may be changed. Some components or features of one embodiment may be included in another embodiment or may be replaced with corresponding components or features of another embodiment.

The expression "a portion includes a specific component" used throughout this specification indicates that the portion may also include other components, rather than including the specific component alone, unless explicitly stated otherwise.

Portions which are not specifically related to the present invention will now be described in order to clearly explain the present invention and like reference numbers will be used throughout the drawings to refer to like parts.

The embodiments of the present invention have been described focusing mainly on the data communication relationship between a terminal and a Base Station (BS). The BS is a terminal node in a network which performs communication directly with the terminal. Specific operations which have been described as being performed by the BS may also be performed by an upper node as needed.

That is, it will be apparent to those skilled in the art that the BS or any other network node may perform various operations for communication with terminals in a network including a number of network nodes including BSs. Here, the term "base station (BS)" may be replaced with another term such as "fixed station", "Node B", "eNode B (eNB)", or "access point". The term "terminal" may also be replaced with another term such as "User Equipment (UE)", "Mobile Station (MS)", "Mobile Subscriber Station (MSS)", "mobile terminal", or "Subscriber Station (SS)".

Although the following description will be given with reference to a femto Advanced Base Station (ABS) as an intermediate access point between an ABS and an AMS, the intermediate access point needs not be limited to the femto ABS and may include a relay station, a pico cell, or the like.

The embodiments of the present invention may be implemented by various means. For example, the embodiments of the present invention may be implemented by hardware, firmware, software, or any combination thereof.

In the case where the present invention is implemented by hardware, a method and apparatus according to an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case where the present invention is implemented by firmware or software, the method and apparatus according to the embodiments of the present invention may be implemented in the form of modules, processes, functions, or the like which perform the features or operations described below. Software code can be stored in a memory unit so as to be executed by a processor. The memory unit may be located inside or outside the processor and can communicate data with the processor through a variety of known means.

The embodiments of the present invention can be supported by standard documents of at least one of the IEEE 802 system, the 3GPP system, the 3GPP LTE system, and the 3GPP2 system which are wireless access systems. That is, steps or portions that are not described in the embodiments of the present invention for the sake of clearly describing the spirit of the present invention can be supported by the standard documents. For all terms used in this disclosure, reference can be made to the standard documents.

Specific terms used in the following description are provided for better understanding of the present invention and can be replaced with other terms without departing from the spirit of the present invention.

The following is a description of three methods for detecting femto ABSs located around an AMS.

In the first method, a macro ABS which overlays with femto ABSs transmits a list of femto ABSs present around an AMS to the AMS to allow the AMS to scan femto ABSs included in the list.

In the second method, a macro ABS which overlays with a femto ABS allows the femto ABS to monitor an uplink signal of an AMS which is being served by the macro ABS. This method is generally referred to as snooping. In the snooping method, the femto ABS monitors a specific uplink signal (for example, a ranging preamble of a dedicated ranging slot) transmitted from the AMS and the femto ABS transmits a message requesting handover of the AMS or the like to the serving macro ABS of the AMS when a received signal quality (for example, a Received Signal Strength Indicator (RSSI)) of the monitored uplink signal is equal to or higher than a predetermined threshold.

In the third method, femto ABSs transmit a specific Inter-Working Signal (IWS) to an AMS in an interval in which the AMS can receive signals with the same Frequency Assignment (FA) to allow the AMS to detect the femto ABSs. This method may be referred to as a femto BS-initiated IWS scheme which is distinguished from an MS-initiated IWS that will be described later. In order to perform this method, information regarding an FA with which all femto ABSs are to transmit an FBS-initiated IWS can be received from the overlaying macro ABS.

The following is a description of a procedure for handing over from a macro ABS to a femto ABS.

The case in which an AMS hands over to a femto ABS by help of a macro ABS and the case in which an AMS actively detects a femto ABS and hands over to the femto ABS may be considered in association with a method for detecting a femto ABS.

First, the case in which an AMS hands over to a femto ABS while being coordinated by a macro ABS is described below with reference to FIG. 2.

In step S201, an AMS may receive a neighbor advertisement (AAI_NBR-ADV) message from a serving ABS (BSID 1) which is a macro ABS. The AAI_NBR-ADV message contains System Information (SI) of neighbor ABSs. For example, the AAI_NBR-ADV may include a Base Station Identifier (BSID) of each neighbor ABS, a Medium Access Control (MAC) version of each neighbor ABS, and the like. The AAI_NBR-ADV message may also include the number of femto ABSs in a macro area. The AAI_NBR-ADV message does not include information of closed Subscriber Group (CSG) femto ABSs although the AAI_NBR-ADV message may include Open Subscriber Group (OSG) femto ABSs.

In step S202, the AMS may scan neighbor ABSs according to information included in the AAI_NBR-ADV message. The AMS scans a neighbor macro ABS (BSID 2) and a neighbor OSG femto ABS (BSID 4) since the AAI_NBR-ADV message includes information of only the neighbor macro ABS (BSID 2) and the neighbor OSG femto ABS (BSID 4) as described above.

Alternatively, in step S202, the AMS may perform blind scanning. The term "blind scanning" refers to scanning that an AMS performs on all available ABSs within an entire bandwidth without information regarding target ABSs. In the case where the AMS performs blind scanning, the AMS may also detect a neighbor CSG femto ABS (BSID 3) that is not included in the AAI_NBR-ADV message.

The AMS may detect neighbor femto ABSs in step S203 and may transmit the detection result as a scanning report (AAI_SCN-REP) to the serving ABS in step S204. The AAI_SCN-REP message may include a list of detected femto ABSs, including an ID, a femto ABS preamble index, and a femto ABS type (for example, OSG) of each detected femto ABS (for example, the BSID 3) and measurement results according to triggering conditions.

Upon receiving the scanning report message, the serving ABS may transmit a handover request (HO-REQ) message to the femto ABS (for example, the BSID 3), to which the AMS will hand over, in step S205. The serving ABS then receive information items associated with handover from the femto ABS through a handover response (HO-RSP) message in step S206.

In step S207, the serving ABS may transmit a scanning response (AAI_SCN-RSP) message to the AMS. The scanning response (AAI_SCN-RSP) message may include a precise (or detailed) neighbor femto ABS list or a command to hand over to a favorite femto ABS (BSID 3), a corresponding operation time (action time), a dedicated CDMA ranging code, and the like. The AMS may perform an operation such as handover based on the information included in the scanning response (AAI_SCN-RSP) message.

In step S208, the AMS may transmit a handover indication (HO-IND) message including information, indicating that the AMS will hand over to the target femto ABS (BSID 3), to the serving ABS.

In step S209, the AMS may transmit a ranging request (RNG-REQ) message including the dedicated CDMA code to the target femto ABS (BSID 3) at the operation time included in the scanning response (AAI_SCN-RSP) message. Then, in step S210, the AMS may receive a ranging response (RNG-RSP) including network parameters from the target femto ABS.

In step S211, the AMS may transmit a ranging request (RNG-REQ) message associated with authentication. Then, in step S212, a ranging response (RNG-RSP) message, which includes a station identifier (STID), a flow identifier (FID), and the like allocated to the AMS, may be transmitted from the target femto ABS to the AMS. Thereafter, the AMS and the femto ABS may exchange data with each other (S213).

The above description has been given of a general handover procedure in which the AMS reports a list of femto ABSs detected through scanning to the serving ABS (macro ABS).

Figure 3:
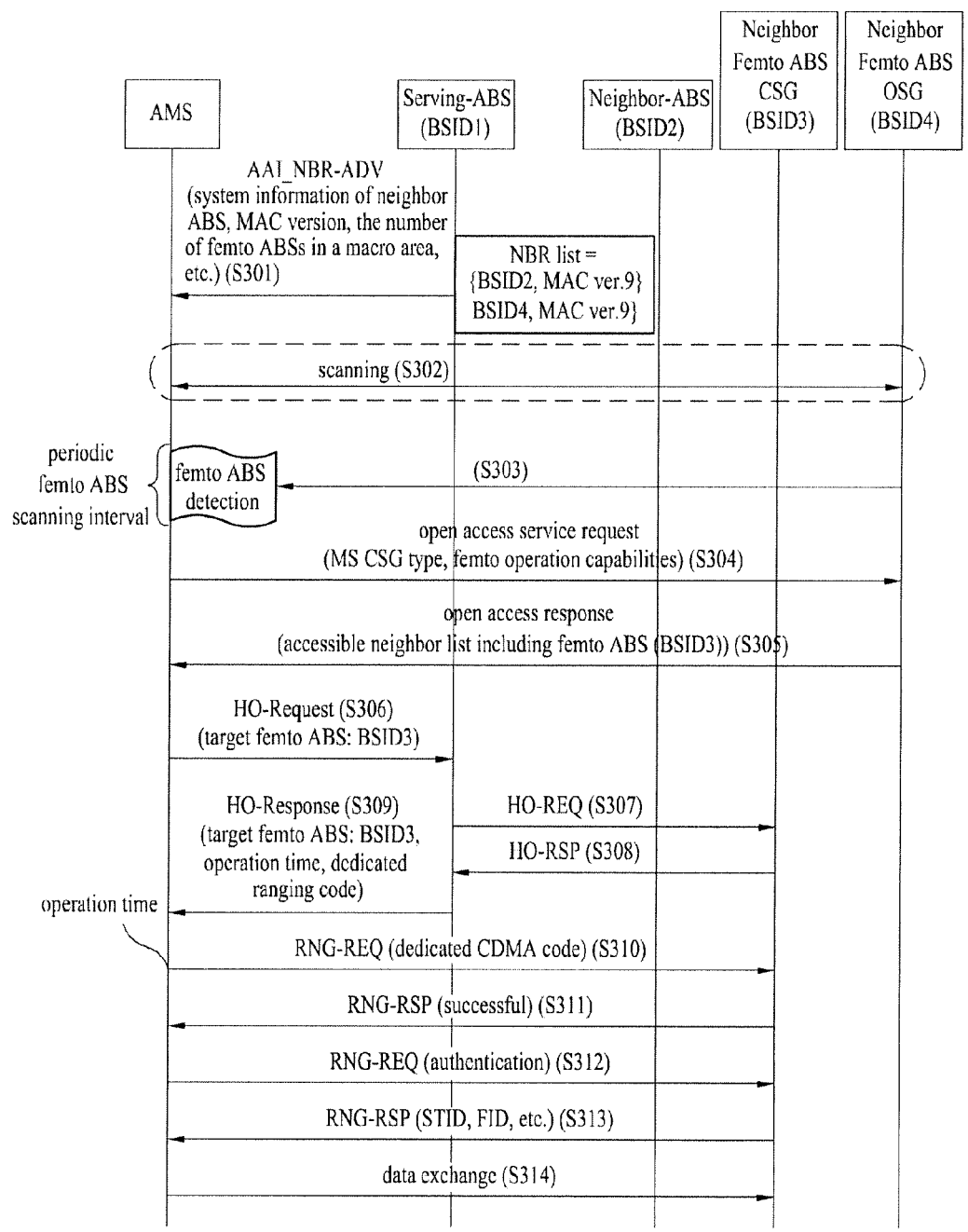
FIG. 3 illustrates an exemplary method in which an AMS hands over to a femto ABS without being coordinated by a macro ABS.

Next, a method in which the AMS directly performs handover to a target femto ABS using a request/response as to whether or not access to the target femto ABS is possible without being initially coordinated by the macro ABS is described below with reference to FIG. 3.

Figure 2:
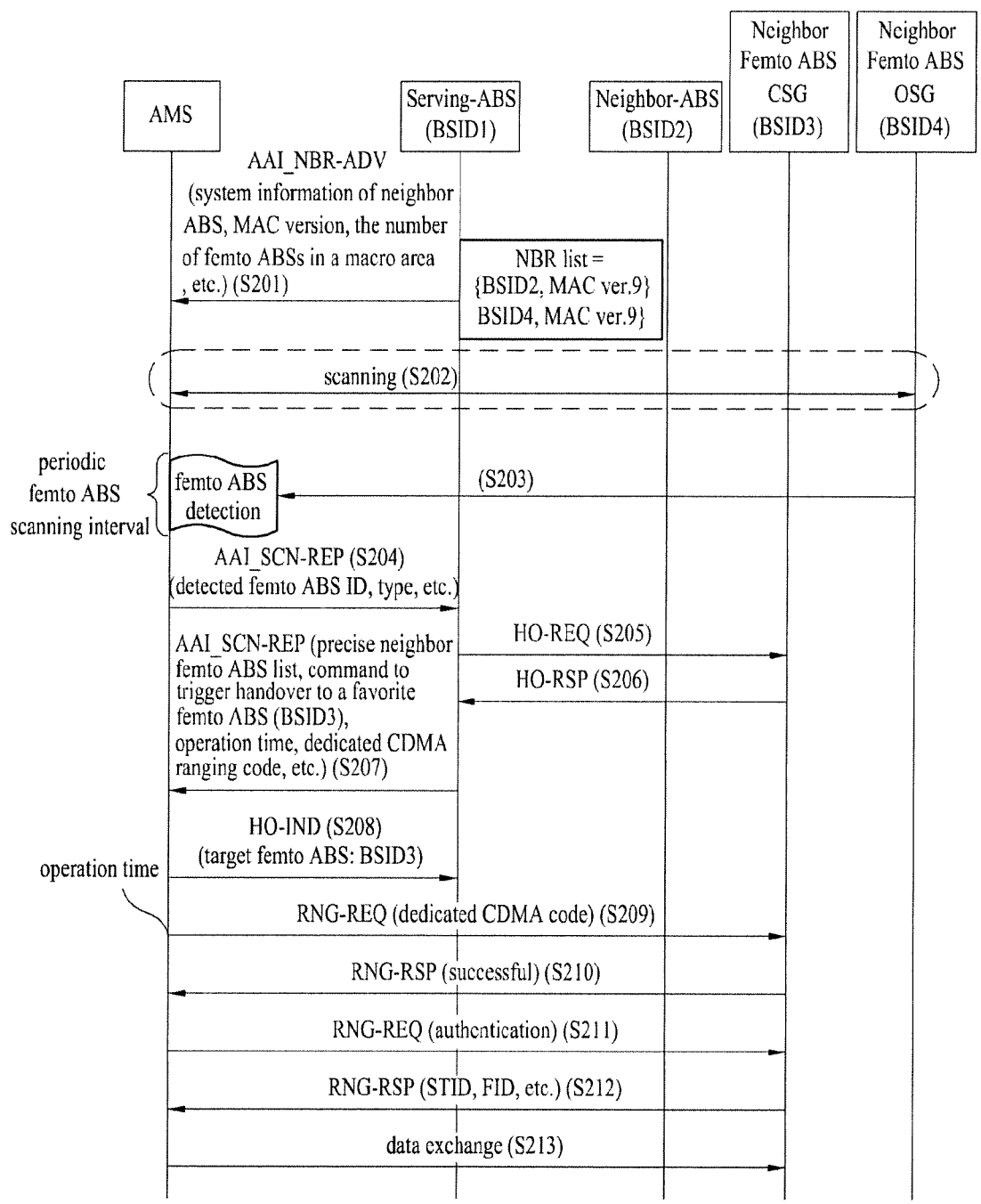
FIG. 2 illustrates an exemplary method in which an AMS hands over to a femto ABS while being coordinated by a macro ABS.

A description of steps S301 to S303 is omitted herein since steps S301 to S303 are similar to the above steps S201 to S203 of FIG. 2.

In step S304, the AMS may transmit an open access service request message to detected femto ABSs. The open access service request message may include information of the AMS such as a CSG type (CSG-closed or CSG-open) and femto ABS operation capabilities of the AMS.

In step S305, the AMS may receive an open access response message. The open access response message may include a list of neighbor ABSs which can be accessed by the AMS. In this embodiment, it is assumed that the AMS can be served by the femto ABS (BSID 3).

In step S306, the AMS may transmit a handover request (HO-Request) message for the target femto ABS (BSID 3) to the serving macro ABS based on the information included in the open access response message.

The serving macro ABS (BSID 1) may transmit a handover request (HO-REQ) message to the macro ABS (BSID 2) in step S307 and may then receive a handover response (HO-RSP) message in step S308. Accordingly, in step S309, the serving macro ABS may transmit a handover response (HO-Response) message to the AMS. The handover response (HO-Response) message may include a BSID (BSID 3) of the target femto ABS, a corresponding operation time (action time), a dedicated CDMA ranging code, and the like.

A description of the subsequent steps S309 to S314 is omitted herein since steps S309 to S314 are similar to the above steps S208 to S213 of FIG. 2.

In association with the handover procedure and femto ABS detection method described above, there is a problem in that it is difficult for the AMS to scan and detect CSG femto ABSs when a CSG femto ABS which can provide high QoS is present around the AMS since the AAI_NBR-ADV message does not include CSG femto ABS information. For example, to scan CSG femto ABSs, the AMS needs to scan all neighbor ABSs. Thus, the AMS performs scanning over an entire frequency range as when it performs blind scanning. In this regard, a large number of femto ABSs may be present within the macro area since the coverage of the femto ABS is narrow. Thus, a large number of femto ABSs may be present around the AMS and overhead of the AMS may significantly increased if the AMS performs the handover procedure as described above. That is, since the number of ABSs that should be scanned by the AMS is significantly increased, the burden of the AMS having to detect a macro ABS, a relay station, or a number of femto ABSs each time the AMS performs scanning is greatly increased. In addition, in the case where the AMS scans all neighbor ABSs, handover delay may be seriously increased since it requires a lot of resources and time to detect an appropriate femto ABS since there are many neighbor femto ABSs.

On the other hand, in the case where neighbor femto ABSs are detected according to the snooping scheme described above, there is a problem in that it is not possible to confirm whether or not a signal received through monitoring by a femto ABS has been received from an AMS which is within the coverage of the femto ABS.

There may be the following problems in the case where femto ABSs around the AMS are not correctly and efficiently detected as described above. First, there may be a problem in that it is difficult to mitigate interference caused by femto ABSs. There may also be a problem in that, even though a femto ABS, which provides a stronger signal and a better channel than the current serving macro ABS or femto ABS of the AMS, is present around the AMS, the AMS cannot hand over to the femto ABS.

Further, the neighbor advertisement (AAI_NBR-ADV) message transmitted from the serving macro ABS to the AMS includes information regarding femto ABSs to be scanned by the AMS as described above. However, the AAI_NBR-ADV message does not include information regarding CSG femto ABSs although the message AAI_NBR-ADV may include regarding OSG femto ABSs. That is, the AMS needs to additionally detect CSG femto ABSs since the AAI_NBR-ADV message does not necessarily include information of all femto ABSs.

The following is a description of a new method and apparatus for correctly and efficiently detecting all femto ABSs located around an AMS.

First, a description is given of a method for calculating the distance between a femto ABS and an AMS in order to overcome the problems of the femto ABS detection methods described above. In the case where it is possible to determine the distance between a femto ABS and an AMS, the femto ABS can determine whether or not the AMS is present within the coverage of the femto ABS.

In order to calculate the distance between an ABS (or femto ABS) and an AMS, it is possible to use a transmission power level with which an uplink message is transmitted and a reception power level with which the uplink message is received.

The present invention does not necessarily require accurate distance calculation results. It is only necessary to derive a rough distance between an ABS and an AMS since the distance calculation results are used to determine a more appropriate femto ABS to which the AMS is to hand over or is used to determine whether or not the AMS which has transmitted the uplink message is present within the coverage of the ABS.

Any of various known distance calculation methods may be used to calculate the distance. The following is a description of an exemplary known distance calculation method that can be applied to the present invention.

Here, it is assumed that an ABS has received an uplink signal with reception power Pr when an AMS has transmitted the uplink signal with transmission power Pt. To calculate a rough distance between the AMS and the ABS, the ABS may assume that a communication path between the AMS and the ABS is in an ideal condition. Under this assumption, it is possible to calculate a rough distance between the AMS and the ABS from the transmission power and the reception power using the following equation.

$$R = K \cdot (Pt/Pr)^{1/2} [m],$$

where $K = (\lambda/4\pi) \cdot (Gt \cdot Gr)^{1/2}$ [Expression 1]

Expression 1 is acquired from a known Friis Transmission Equation. In Expression 1, R denotes the distance between the ABS and the AMS, Pt denotes the transmission power of the uplink signal, Pr denotes the reception power with which the ABS has received the uplink signal, $\lambda$ denotes the wavelength of the uplink signal, Gt denotes transmission antenna gain of the AMS, and the Gr is reception antenna gain of the ABS. When the ABS has received the uplink message, the ABS can determine the value Pt since Pt may be preset or may be previously signaled to the ABS through uplink message setting information or may be included as transmission power information in a header (or a subheader) of the uplink message as described later. Since $\lambda$, Gt, and Gr are predetermined or known values, the ABS can easily determine the value K. Pr can be determined by any ABS which has received the uplink message. Accordingly, the ABS can calculate the distance R between the AMS and the ABS using Pt and Pr according to Expression 1.

Alternatively, as described later, each of one or more femto ABSs may measure the distance between the femto ABS and the AMS and report the measurement result to the serving macro ABS to allow the macro ABS to determine an appropriate femto ABS. In this case, it may be required that the relative distances between the AMS and the femto ABSs be compared and determined.

In this case, let us assume that an AMS transmits an uplink signal with transmission power Pt, an ABS A receives the uplink signal with reception power Pr1, and an ABS B receives the uplink signal with reception power Pr2. If Pr1>Pr2, the ABS A may determine the relative distance since the ABS A is closer to the AMS than the ABS B.

As needed, it is possible to use an appropriate method from various other known methods, which can more accurately derive the distance, other than the distance calculation methods described above.

These distance calculation methods can be applied to a variety of embodiments associated with uplink transmission which are not described in this specification.

The serving macro ABS may command the AMS to incorporate information regarding the transmission power of the AMS into a header (or a subheader) of uplink data. This command may be issued through an uplink grant message transmitted from the serving macro ABS to the AMS, for example, through an uplink MAP or a physical layer downlink channel (specifically, a Physical Downlink Control CHannel (PDCCH)). Thus, when the AMS transmits a variety of uplink data, information regarding transmission power may be incorporated into a header (or subheader).

The macro ABS and the femto ABS may exchange information such as an AMS list of the femto ABS. In the case where an AMS included in the AMS list accesses the macro ABS and transmits uplink data, the macro ABS may transmit setting information associated with uplink transmission of the AMS to the femto ABS. This transmission may be performed through a backbone network. The setting information associated with uplink transmission of the AMS may include information for setting the transmission power, with which the AMS performs uplink transmission, to a specific power level. The femto ABS may determine a reception power level of the uplink signal when it has received the uplink signal and may calculate the distance between the femto ABS and the AMS based on the uplink transmission power level received from the macro ABS.

The following is a description of an embodiment associated with calculation of the distance using an uplink transmission power level.

In the case where the macro ABS transmits setting information associated with uplink transmission of the AMS to femto ABSs, scheduling latency (or delay) may occur due to the transmission of the setting information through a backbone network. That is, there may be a situation in which, even though the AMS has transmitted uplink data with transmission power specified by the macro ABS, the femto ABS has not received setting information associated with the uplink transmission of the AMS. In this case, even though the AMS has transmitted uplink data with the transmission power specified by the macro ABS, the femto ABS may fail to calculate the distance between the femto ABS and the AMS since the femto ABS does not know the transmission power. In order to remove such latency (or delay), it may be more preferable to use an uplink control channel dedicated to the AMS.

The AMS-dedicated uplink control channel may be, for example, a Channel Quality Indicator Channel (CQICH), a Fast FeedBack Channel (FFBCH), a sounding channel, a periodic ranging channel, or a Physical Uplink Control Channel (PUCCH).

An uplink control channel such as the CQICH, the FFBCH, the sounding channel, or the PUCCH may be allocated in a persistent manner and may be transmitted at regular intervals. Thus, it is possible to easily determine when the next transmission of the uplink control channel is performed. Accordingly, the macro ABS may instruct the AMS to transmit an uplink control channel at a specific time with a specific transmission power level and may previously notify the femto ABS of information of the uplink control channel transmission, which has been instructed to the AMS, taking into consideration backbone network latency of the transmission from the macro ABS to the femto ABS. This allows the femto ABS to more reliably receive the uplink control channel of the AMS and calculate the distance using the transmission power and the reception power.

Figure 4:
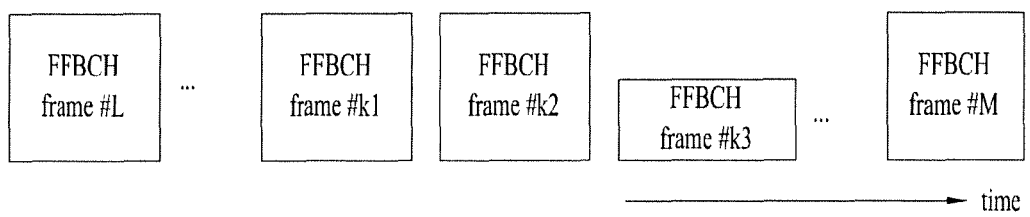
FIGS. 4(a) and 4(b) illustrate a frame of an uplink control channel according to an embodiment of the present invention.
Figure 4:
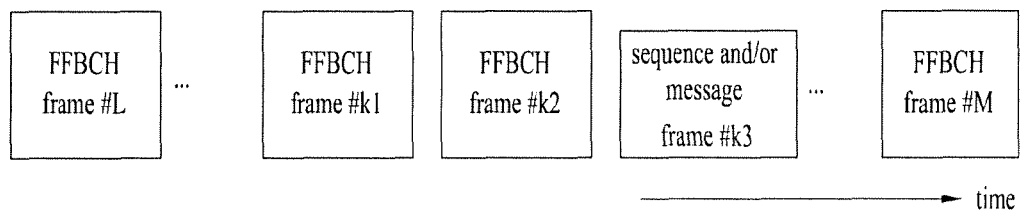

An embodiment of the present invention is described below with reference to FIG. 4(a).

The macro ABS may instruct the AMS to transmit an FFBCH in a frame #k3 with a specified transmission power. Together with this instruction, the macro ABS may notify the femto ABS of information regarding the uplink control channel transmission instructed to the AMS. The macro ABS may send the instruction at a time that precedes the frame #k3 by a predetermined time and the predetermined time may be determined based on the backbone network transmission latency such that the femto ABS has a sufficient time to prepare for the reception of the FFBCH.

When it is assumed that the FFBCH is transmitted in a frame #M with a specified transmission power, the instruction may be transmitted from the macro ABS to the AMS and the femto ABS in a frame #L which precedes the frame #M (i.e., L<<M).

The femto ABS may calculate the distance between the femto ABS and the AMS using the transmission power and the reception power of the FFBCH of which the macro ABS has previously notified the femto ABS.

In the case where a sounding channel is used, the macro ABS may notify the femto ABS of which sequence is to be used in the sounding channel. The AMS may transmit the sequence with a transmission power specified by the macro ABS or with a predetermined transmission power and the femto ABS may calculate the distance between the femto ABS and the AMS using a reception power, with which the femto ABS has received the sequence, and the sequence transmission power received from the macro ABS.

Another embodiment of the present invention is described below with reference to FIG. 4(b).

While the FFBCH is transmitted in the frame #k3 with a specified transmission power in the embodiment of FIG. 4(a), the AMS may instead transmit a sequence and/or a message in the frame #k3 in this embodiment. This transmission may be performed as an event indicated by the macro ABS or as a predetermined event. Here, the sequence may be used as a pilot for decoding the message.

The sequence and/or the message may be transmitted with a transmission power indicated by the macro ABS or with a predetermined transmission power. Alternatively, information regarding the transmission power may be included in the message. The macro ABS may transmit setting information associated with such sequence transmission to the femto ABS. The femto ABS may calculate the distance between the femto ABS and the AMS using a power, with which the sequence has been received through the FFBCH, and transmission power of the sequence.

In the case where a femto ABS present around an AMS has detected an uplink signal, the femto ABS may calculate the distance between the AMS and the femto ABS and determine whether or not the uplink signal monitored by the femto ABS has been received from an AMS which is within the coverage of the femto ABS. Accordingly, it is possible to perform mitigation of interference caused by the femto ABS, handover of the AMS to the femto ABS, and the like, thereby allowing the AMS to receive a service with higher quality.

Next, a description is given of embodiments to which a method for calculating the distance between an AMS and an ABS (or a femto ABS) from a transmission power level and a reception power level of uplink transmission is applied.

First, an embodiment in which a method for an AMS to notify neighbor ABSs (femto ABSs) of presence of the AMS using an uplink message is applied to the method for calculating the distance between the AMS and the ABS described above is described below with reference to FIG. 5. The uplink message through which the AMS notifies neighbor ABSs of the presence of the AMS may be referred to as an MS self-advertisement message. The MS self-advertisement may be an InterWorking Signal (IWS) initiated by the AMS (i.e., an MS-initiated IWS).

In step S501 of FIG. 5, the AMS may receive a neighbor advertisement (AAI_NBR-ADV) message broadcast by a serving macro ABS (serving-ABS). The AAI_NBR-ADV message includes System Information (SI) of neighbor ABSs. For example, the AAI_NBR-ADV message may include a Base Station Identifier (BSID) of each neighbor ABS, a Medium Access Control (MAC) version of the neighbor ABS, the number of femto cells in the macro area, and the like. The AAI_NBR-ADV message may include such information of a neighbor macro ABS, a relay ABS, and OSG femto ABSs.

In step S502, the AMS may perform scanning on, for example, a neighbor macro ABS (BSID 2) and an OSG femto ABS (BSID 4) according to a network topology acquired through the AAI_NBR-ADV message. Since the AMS performs such scanning according to a neighbor ABS list provided through the AAI_NBR-ADV message, an ABS (for example, a CSG femto ABS (BSID 3)) that is not included in the AAI_NBR-ADV message cannot be included in a list of ABSs for scanning. To detect even the neighbor ABSs that are not included in the AAI_NBR-ADV message, the AMS needs to perform a procedure such as blind scanning which imposes a great burden on the AMS in terms of resource utilization and power management.

In this embodiment, the AMS does not perform a procedure for scanning and detecting all neighbor ABSs. Instead, the AMS broadcasts an uplink message indicating the presence of the AMS (for example, a self-advertisement message such as an AMS-initiated IWS) to neighbor ABSs (for example, femto ABSs) and the neighbor ABSs detect the AMS through the AMS-initiated IWS to reduce the burden of having to scan and detect neighbor ABSs.

In step S503, the serving macro ABS may provide uplink message setting information (i.e., setting information associated with the AMS-initiated IWS) to the AMS. The MS-initiated IWS setting information may include known femto ABS operation Frequency Assignment (FA), a known signaling time or resource region of the MS-initiated IWS, transmission power used to transmit the MS-initiated IWS, and the like. The MS-initiated IWS may be allocated to each AMS in a distributed manner so as to avoid competitions.

In step S504, the serving macro ABS (serving-ABS) may provide MS-initiated IWS setting information to femto ABSs within the coverage of the macro ABS. In addition, all configuration information provided to the AMS may be shared between femto ABSs within the macro area.

The process of step S503 may be performed upon initial network entry or network reentry or at the request of the AMS. Step S504 may also be performed prior to step S503. As a result, the MS-initiated IWS setting information provided to the AMS may be shared between the femto ABSs through steps S503 and S504.

In steps S505-1 and S505-2, the AMS may broadcast the MS-initiated IWS. The MS-initiated IWS may be transmitted in a periodic manner or in an event-driven manner. The event-driven manner is a manner in which a corresponding operation is performed upon the occurrence of a specific event. One example of the specific event may be a reduction of the quality of a channel between the AMS and the serving macro ABS below a predetermined reference level. Another example of the specific event may correspond to a situation in which an application executed on the AMS requires a service quality (QoS) higher than the quality of the channel between the AMS and the current serving macro ABS.

The MS-initiated IWS may include a station identifier (STID), a MAC address, and a short-ID of the AMS. Here, the short-ID is an ID shorter than the MAC address which can be used to identify the AMS. The MS-initiated IWS may also include a BSID (for example, the BSID 1) of the serving macro ABS.

The MS-initiated IWS may be transmitted with a predefined transmission power. The serving macro ABS may allow the femto ABSs to share the predefined transmission power of the MS-initiated IWS together with other information items of the MS-initiated IWS setting information as described above. Since the femto ABS has already known the possible times of receipt of the MS-initiated IWS, the macro ABSs may detect the AMS by receiving the MS-initiated IWS.

Instead of using the method in which the serving macro ABS predefines the transmission power of the MS-initiated IWS and previously notifies femto ABSs of the predefined transmission power of the MS-initiated IWS, a transmission power with which the AMS transmits the MS-initiated IWS may be included and transmitted as transmission power information in the MS-initiated IWS.

Specifically, the serving macro ABS may command the AMS to incorporate header (or subheader) information regarding the transmission power of the AMS into an uplink signal. This command may be issued through an uplink grant message transmitted from the serving macro ABS to the AMS, for example, through an uplink MAP or a packet data control channel (PDCCH). Thus, when the AMS transmits an uplink message such as an MS-initiated IWS, information regarding transmission power may be incorporated into a header (or subheader) of the uplink message. The femto ABS may calculate a rough distance between the femto ABS and the AMS using the transmission power and reception power of the MS-initiated IWS. Here, the distance between the AMS and the ABS is calculated using the same method as described above.

Each of the femto ABSs (the BSID 3 and the BSID 4), which have detected the MS-initiated IWS in steps S506-1 and 506-2, may transmit an AMS detection report message including an identifier (for example, an STID) of the AMS, status information of the AMS, etc., included in the MS-initiated IWS to the serving macro ABS. A report type of the AMS detection report message may include a handover request, interference mitigation, and the like. The AMS detection report message may also include the result of calculation of the distance between the AMS and the corresponding ABS.

In step S507, the serving macro ABS may determine a subsequent handover operation based on report messages that are sent from the femto ABSs in steps S506-1 and S506-2. The following are possible examples of the subsequent handover operation.

First, when the femto ABS has reported to the serving macro ABS that the AMS is undergoing interference, the serving macro ABS may perform an interference mitigation procedure. The serving macro ABS may perform the interference mitigation procedure in a manner in which it signals a resource reservation to the femto ABS which causes the interference or in another appropriate manner.

Second, if a femto ABS which can provide higher Quality of Service (QoS) to the AMS (or a femto ABS which is closer to the AMS) is present, the serving macro ABS may initiate a procedure for the AMS to hand over to the femto ABS.

Third, in the case where a plurality of femto ABSs are present as possible handover candidate ABSs and the AMS is present within the coverages of the femto ABSs, the serving macro ABS may provide the AMS with a neighbor list including the neighbor femto ABSs to which the AMS can hand over. Here, whether or not the AMS is present within the coverage of each femto ABS may be determined based on a calculation result report of the distance between the AMS and the femto ABS.

Fourth, based on a report message from each femto ABS, the AMS may decide to maintain a connection currently established with the serving macro ABS without performing handover to the femto ABS.

Next, step S508 and subsequent steps are described assuming that the serving macro ABS has determined, as a subsequent handover operation, an operation for allowing the AMS to hand over to the target femto ABS (for example, the BSID 3).

Here, the neighbor ABS list provided from the serving macro ABS through the AAI_NBR-ADV message does not include the CSG femto ABS (the BSID 3) as described above. However, since the AMS broadcasts an uplink message such as a self-advertisement message and the CSG femto ABS (the BSID 3) detects the uplink message and reports the detection to the serving macro ABS, the CSG femto ABS (the BSID 3) may become a handover target ABS without the overhead of the AMS for scanning a large number of ABSs around the AMS.

The serving macro ABS may transmit a handover request (HO-REQ) message to the target femto ABS (the BSID 3) in step S508 and then may receive a handover response (HO-RSP) message in step S509.

In step S510, the serving macro ABS may transmit a handover command (HO-CMD) to the AMS. The handover command (HO-CMD) message may include system information of the target femto ABS (the BSID 3) and parameters (for example, the operation time or action time) required for handover.

A description of steps S511 to S516 is omitted herein since steps S511 to S516 are similar to the above steps S208 to S213 of FIG. 2.

In the embodiment of the present invention described above, the AMS detects an ABS (for example, the CSG femto ABS (the BSID 3)) which is not included in the AAI_NBR-ADV message according to a scheme in which the AMS transmits an uplink message, for example, a self-advertisement message such as an MS-initiated IWS and each femto ABS detects the uplink message without performing a procedure such as blind scanning and therefore it is possible to reduce overhead caused when the AMS scans and detects a large number of neighbor ABSs.

In addition, femto ABSs which have received MS-initiated IWS setting information from the macro ABS can detect the AMS based on the received information. Accordingly, each femto ABS around the AMS can correctly detect the AMS which has transmitted the MS-initiated IWS and it is possible to perform mitigation of interference caused by the femto ABS, handover of the AMS to the femto ABS, and the like.

Further, the serving macro ABS may predefine the transmission power of the MS-initiated IWS and notify each femto ABS of the predefined transmission power of the MS-initiated IWS or alternatively information regarding the transmission power of the MS-initiated IWS may be included in the MS-initiated IWS and then may be transmitted together with the MS-initiated IWS to each femto ABS. In both cases, each femto ABS which has received the MS-initiated IWS can determine the level of power with which the MS-initiated IWS has been transmitted. Since the femto ABS can also determine the level of power with which the MS-initiated IWS has been received by the femto ABS, the femto ABS can calculate the distance between the femto ABS and the AMS using the transmission power and the reception power of the MS-initiated IWS. The distance calculation result may be transmitted to the serving macro ABS to allow the serving macro ABS to determine a more appropriate femto ABS to which the AMS can hand over.

Next, an embodiment in which, instead of using the MS-initiated IWS described with reference to FIG. 5, an AMS uses a periodic ranging message as an uplink message (i.e., as a self-advertisement message of the AMS) is described below with reference to FIG. 6.

A description of steps S601 and S602 is omitted herein since steps S601 and S602 are similar to the above steps S201 and S202 of FIG. 2.

In step S603, the serving macro ABS (serving-ABS) may provide setting information associated with periodic ranging such as a ranging area and a ranging timing to the AMS. The serving macro ABS may distribute a set of periodic ranging codes to a group of AMSs and each AMS may selectively use a periodic ranging from among the set of periodic ranging codes allocated to the AMS. Alternatively, a dedicated ranging code may be allocated to each AMS. In addition, the serving macro ABS may predefine a transmission power with which the periodic ranging is transmitted and provide the setting information to the AMS.

In step S604, the serving macro ABS may allow femto ABSs present within the coverage of the macro ABS to share the periodic ranging setting information. Step S604 may be performed prior to step S603.

In steps S605-1 and S605-2, the AMS may transmit the periodic ranging message to the femto ABSs. The periodic ranging message may be transmitted together with an identifier (for example, an STID) of the AMS, a BSID (for example, the BSID 1) of the current serving macro ABS, and the like. The periodic ranging may be transmitted based on information provided from the serving macro ABS and may be transmitted with a limited transmission power predefined by the serving macro ABS or with a transmission power adjusted through power control. In the case where a limited level of transmission power is used for periodic ranging, the limited level of transmission power for periodic ranging may be shared between femto ABSs through periodic ranging setting information. Information regarding transmission power may be included in a periodic ranging message.

Since the serving macro ABS has notified the femto ABSs of the setting information of the periodic ranging (for example, a region and timing where the periodic ranging is transmits) from the AMS, the femto ABSs can correctly receive the periodic ranging from the AMS. The femto ABSs can also confirm a code included in the periodic ranging message and a time slot in which the periodic ranging message has been received.

Each of the ABSs which have received the periodic ranging message from the AMS can determine a level of reception power with which the message has been received. Each of the ABSs which has received the periodic ranging message can calculate a rough distance between the ABS and the AMS using the reception power level and the transmission power level described above which may be included as transmission power information in the periodic ranging message or may be preset by the serving macro ABS and may then be signaled to the femto ABS. Here, the distance between the ABS and the AMS is calculated using the same method as described above.

In steps S606-1 and S606-2, the femto ABSs may transmit an AMS detection report message to the serving macro ABS to report the received periodic ranging codes and the time slot, in which the periodic ranging message has been received, to the serving macro ABS. The AMS detection report message may include an identifier (STID) of the AMS and the like. A report type of the AMS detection report message may include a handover request, interference mitigation, and the like. The AMS detection report message may also include the result of calculation of the distance between the AMS and the corresponding ABS.

In step S607, the serving macro ABS may identify an AMS which has transmitted the periodic ranging message, from the information reported from the femto ABSs which includes the periodic ranging codes and the time slot in which the periodic ranging message has been received. The serving macro ABS may determine a subsequent operation based on the AMS detection report messages (including the distance calculation results) that are sent from the femto ABSs in steps S606-1 and S606-2. The subsequent operation may be an interference mitigation operation, an operation for handover to a corresponding femto ABS, an operation for providing a neighbor list including the femto ABSs to the AMS, or an operation for maintaining a connection with the current serving macro ABS.

A description of steps S608 to S616 is omitted herein since steps S608 to S616 are similar to the above steps S508 to S516 of FIG. 5.

According to this embodiment of the present invention, it is possible to reduce overhead caused when the AMS scans and detects a large number of femto ABSs. In addition, femto ABSs present around the AMS can correctly detect the AMS. Further, it is possible to calculate the distance between each femto ABS and the AMS using the transmission power and reception power of the periodic ranging message and thus to select a more appropriate femto ABS to which the AMS is to hand over.

An AMS and an ABS which can implement the embodiments of the present invention described above with reference to FIGS. 4 to 6 are described as another embodiment of the present invention with reference to FIG. 7.

The AMS may operate as a transmitter in uplink and operate as a receiver in downlink. The ABS may also operate as a transmitter in uplink and operate as a receiver in downlink. That is, each of the AMS and the ABS may include a transmitter and a receiver for transmitting and receiving information or data.

Each of the transmitter and the receiver may include a processor, a module, a portion, and/or a means for implementing the embodiments of the present invention. Specifically, each of the transmitter and the receiver may include a module (means) for encrypting a message, a module for analyzing an encrypted message, an antenna for transmitting and receiving a message, and the like. An example of the transmitter and the receiver is described below with reference to FIG. 7.

The left side of FIG. 7 shows a structure of the transmitter and the left side shows a structure of the receiver. The transmitter and the receiver may include antennas 700 and 710, processors 720 and 730, transmission modules (Tx modules) 740 and 750, reception modules (Rx modules) 760 and 770, and memories 780 and 790, respectively. Each pair of components may perform a corresponding function. The following is a detailed description of each of the components.

The antennas 700 and 710 transmit signals generated from the transmission modules 740 and 750 to the outside or receive radio signals from the outside and transfer the received signals to the reception modules 760 and 770. In the case where Multiple Input Multiple Output (MIMO) is supported, each of the AMS and the ABS may include two or more antennas.

In general, the processors 720 and 730 control overall operation of the ABS and the AMS, respectively. Particularly, each of the processors 720 and 730 may perform a control function, a Medium Access Control (MAC) frame variable control function according to service characteristics and a propagation environment, a handover function, an authentication and encryption function, and the like in order to perform the embodiments of the present invention described above.

For example, when performing steps associated with the femto ABS detection method described above, the processor of the AMS may control the transmission module 750 to generate an uplink message after determining information to be included in the uplink message and then to transmit the uplink message to the ABS at an appropriate time. The uplink message may be a self-advertisement message such as an MS-initiated IWS or a periodic ranging message. When the AMS transmits the uplink signal, the AMS may incorporate transmission power of the uplink signal into a header (or a subheader) of the uplink signal. The processor 730 may control the reception module 770 to analyze information included in a neighbor advertisement message received from the ABS, a signal including uplink message setting information, a handover command message, a ranging response message, and the like and determine and perform an appropriate operation corresponding to the analyzed information.

The processor of the ABS may analyze a MAC message or data received from the AMS, allocate uplink resources required for the AMS, generate an uplink grant for notifying the AMS of the allocation or the like, and performs scheduling for transmitting the uplink grant. The processor of the ABS may also analyze information included in a message from another ABS and transfer the message to another AMS or ABS. The processor of the ABS may also allocate an identifier such as an STID or an FID required for the AMS and generate and transmit a MAC message including the corresponding information to the AMS.

The transmission modules 740 and 750 may perform predetermined coding and modulation on data, which has been scheduled for transmission by the processors 720 and 730 and transmit the resulting data to the antennas 700 and 710, respectively.

The reception modules 760 and 770 may decode and demodulate radio signals received through the antennas 700 and 710 to restore original data and may then transfer the original data to the processors 720 and 730, respectively.

The memories 780 and 790 may store programs for processing and controlling of the processors 720 and 730 and temporarily store input/output data items. For example, the memory of the AMS may temporarily store, as the input/output data items, an uplink grant allocated to the AMS by an ABS, system information, an STID, an FID, capabilities information, and the like. In addition, each of the memories 780 and 790 may include at least one of a flash memory-type storage medium, a hard disc-type storage medium, a multimedia card micro-type storage medium, a card-type memory (e.g. a Secure Digital (SD) or extreme Digital (XS) memory), a Random Access Memory (RAM), a Static RAM (SRAM), a Read-Only Memory (ROM), an Electrically Erasable Programmable Read-Only Memory (EEPROM), a Programmable Read-Only Memory (PROM), a magnetic memory, a magnetic disc, and an optical disc.

The ABS may perform functions for implementing the embodiments of the present invention described above, such as a controller function, an Orthogonal Frequency Division Multiple Access (OFDMA) packet scheduling function, a Time Division Duplex (TDD) packet scheduling function, and a channel multiplexing function, a MAC frame variable control function according to service characteristics and radio environments, a high-speed traffic real-time control function, a handover function, an authentication and encryption function, a packet modulation/demodulation function for data transmission, a high-speed packet channel coding function, or a real-time modem control function, through at least one of the modules described above or may further include an additional means, module or portion for performing such functions.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention. In addition, claims which are not explicitly dependent on each other can be combined to provide an embodiment or new claims can be added through amendment after this application is filed.

INDUSTRIAL APPLICABILITY

A handover method and apparatus using calculation of the distance between an AMS and an intermediate access point according to the embodiments of the present invention is applicable to mobile communication systems and wireless communication industries.

The invention claimed is:

1. A method for an intermediate access point to perform handover based on a distance between the intermediate access point and a Mobile Station (MS) in a wireless communication system, the method comprising:
   receiving, by the intermediate access point from a serving base station (BS) of the MS, first information required to obtain an uplink message of the MS, via a backbone network between the intermediate access point and the serving BS;
   overhearing, by the intermediate access point, the uplink message using the first information, the uplink message being directed to the serving BS and including second information regarding a transmission power used by the MS to transmit the uplink message;
   determining, by the intermediate access point, a reception power of the uplink message;
   calculating, by the intermediate access point, a distance between the intermediate access point and the MS using the transmission power included in the uplink message and the reception power of the uplink message; and
   performing, by the intermediate access point, a subsequent handover operation with the MS based on the calculated distance,
   wherein a transmission timing of the uplink message is determined based on a latency of the backbone network between the serving BS and the intermediate access point such that the intermediate access point receives the first information prior to the MS transmitting the uplink message.

2. The method according to claim 1, further comprising:
   detecting the MS based on the uplink message and the first information,
   wherein the uplink message is transmitted by the MS in an event-driven manner including an event that an application executed in the MS requires a QoS (Quality of Service) higher than a QoS provided by the serving BS, and wherein the transmission power is predetermined by the serving BS.

3. The method according to claim 2, wherein the first information includes at least a dynamic Frequency Assignment (FA), timing of the uplink message, a resource region, or the transmission power, and
   the uplink message further includes at least an identifier of the MS, an Base Station Identifier (BSID) of the serving BS, or status information of the MS.

4. The method according to claim 1, wherein the uplink message is an MS-dedicated uplink control channel message, and
   the MS-dedicated uplink control channel is one of a Channel Quality Indicator Channel (CQICH), a Fast Feed-Back Channel (FFBCH), a sounding channel, or a Physical Uplink Control Channel (PUCCH).

5. The method according to claim 2, wherein the first information includes information specifying a frame M in which the uplink message is to be transmitted and is received at a timing of a frame L which precedes the frame M by a predetermined number of frames.

6. The method according to claim 1, further comprising:
   transmitting a report message including a result of calculating the distance to the serving BS.

7. An intermediate access point for performing handover based on a distance between the intermediate access point and a Mobile Station (MS) in a wireless communication system, the intermediate access point comprising:
   a receiver; and
   a processor operatively connected to the receiver and configured to:
     receive, from a serving base station (BS) of the MS, first information required to obtain an uplink message of the MS, via a backbone network between the intermediate access point and the serving BS;
     overhear the uplink message using the first information, the uplink message being directed to the serving BS and including second information regarding a transmission power used by the MS to transmit the uplink message;
     determine a reception power of the uplink message;
     calculate a distance between the intermediate access point and the MS using the transmission power included in the uplink message and the reception power of the uplink message; and
     perform a subsequent handover operation with the MS based on the calculated distance,
   wherein a transmission timing of the uplink message is determined based on a latency of the backbone network between the serving BS and the intermediate access point such that the intermediate access point receives the first information prior to the MS transmitting the uplink message.

* * * * *